United States Patent [19]

Bolto et al.

[11] 4,167,610

[45] Sep. 11, 1979

[54] ION EXCHANGE PRODUCTS AND PROCESSES USING CROSSLINKED ALLYLAMINE COPOLYMERS

[75] Inventors: Brian A. Bolto, Mitcham; Kurt H. Eppinger, Bentleigh East, both of Australia

[73] Assignee: ICI Australia Limited, Melbourne, Australia

[21] Appl. No.: 853,812

[22] Filed: Nov. 21, 1977

[30] Foreign Application Priority Data

Dec. 13, 1976 [AU] Australia ............................... PC 8477

[51] Int. Cl.² .......................... C08F 291/12; C08J 7/02
[52] U.S. Cl. ...................................... 521/31; 525/359; 525/217
[58] Field of Search ......................... 260/2.1 R, 2.2 R; 526/23; 521/31

[56] References Cited

U.S. PATENT DOCUMENTS

| 2,456,428 | 12/1948 | Parker | 526/23 |
| 2,912,390 | 3/1959 | Jaruzelski | 260/2.1 |
| 3,840,482 | 2/1974 | Bolto et al. | 260/2.1 R |
| 3,862,059 | 1/1975 | Greco et al. | 526/23 |

Primary Examiner—Joseph L. Schofer
Assistant Examiner—Peter Kulkosky
Attorney, Agent, or Firm—Cushman, Darby & Cushman

[57] ABSTRACT

Ion exchange resins of the poly(allylamine) type which comprise an aralkyl radical or a saturated aliphatic radical, and which may be made by reacting an allylamine type polymer with an organic dihalo compound so as to crosslink it.

17 Claims, No Drawings

ION EXCHANGE PRODUCTS AND PROCESSES USING CROSSLINKED ALLYLAMINE COPOLYMERS

This invention relates to thermally regenerable ion-exchange resins, especially amphoteric composite resins, and more particularly it relates to basic ion exchange resinous materials useful as components of such resins and methods whereby such basic components may be prepared.

Amphoteric ion-exchange resins have an important application in water demineralization processes using thermal regeneration as described in publications such as "An Ion Exchange Process with Thermal Regeneration", J. Inst. Engr. Aust. (1965) 37, 193 (Part 1); Aust. J. Chem. (1966) 19, 561 (Part II), 589 (Part III), 765 (Part IV) and 791 (Part V); Aust. J. Chem. (1968) 21, 2703 (Part VI); Desalination (1970) 8, 21 (Part VII); Desalination (1973) 12, 217 (Part VIII); Desalination (1973) 13, 269 (Part IX); and Australian Patent Specifications Nos. 274,029 and 434,130.

Resins having a useful thermally regenerable ion-exchange capacity are those of the weakly acidic and weakly basic type, and particularly useful resins of this class are those described and claimed in the specification of Australian Pat. No. 434,130 as composite ion-exchange resins in particulate form and comprising particulate acidic and basic ion-exchange materials dispersed in a homogeneous matrix of a water-insoluble polymeric material which is permeable to ions and water. These adsorbent resins of Australian Pat. No. 434,130 are often referred to as "plum pudding" resins and for convenience of description they will be so referred to hereinafter in this specification.

The basic ion-exchange materials referred to above may be made from a range of chemicals, and a particularly useful class of such ion-exchange materials is the class of amines, especially unsaturated amines. These amines may be made by a variety of methods which are described in the literature and as an example reference is made to the methods described in the specification of U.S. Pat. No. 3,957,699. From within the class of unsaturated amines it has been found that useful basic ion exchange materials may be derived from amines comprising two or more allyl radicals. Such amines include triallylamine, various diallylamine derivatives such as alkyldiallylamines, aralkyldiallylamines or bis(N,N-diallylamino) alkanes and N,N,N',N'-tetrallylalkanediamines. Typical monomeric representatives of the above class include diallylamine, methyldiallylamine, ethyldiallylamine, n-propyldiallylamine, isopropyldiallylamine, benzyldiallylamine, 1,6-bis(N,N-diallylamino)hexane, 1,4-bis(N,N-diallylaminomethyl)benzene, 1,2,4-tris(N,N-diallylaminomethyl)benzene, 1,3,5-tris(N,N-diallylaminomethyl)benzene, 2,4,6-tris(N,N-diallylaminomethyl)toluene, N-(4-N,N-dimethylaminomethylbenzyl)diallylamine, N-(4-N,N-dipropylaminomethylbenzyl)diallylamine, N-(4-N,N-diisopropylaminomethylbenzyl)diallylamine, N-(4-N,N-diallylaminomethylbenzyl)diallylamine, or triallylamine.

We have now found new materials which are useful as basic ion exchange resins and which are modified polymeric materials derived from amines of the allylamine type.

Accordingly there is provided new compositions of matter which comprise polymeric materials derived from monomers of the allylamine type and comprising additionally a component selected from the group consisting of an aralkyl radical and a saturated aliphatic radical. Suitably the aliphatic radical is an alkane radical such as ethane, propane, butane, hexane, octane and the like, whilst the aralkyl radical may comprise one or more substituted benzene rings such as a xylene residue or a bis alkyl naphthalene residue.

In an embodiment of the invention there is provided a process which comprises treating polymeric material capable of acting as an ion-exchange material and derived from monomers of the allylamine type with a dihalo organic compound in a manner such that the propensity of the said polymeric material to swell is reduced.

The polymeric materials set out above are materials which may be made from the allylamine-containing monomers referred to hereinbefore. The manufacture of such polymers by the polymerization of strong acid salts of the monomers is well known and suitable methods are described in the literature. The dihalo organic compounds used in the process of the invention to provide the new compositions of matter are conveniently dichloro-, dibromodiiodo- compounds and alternatively the halo groups may be a mixture of halogens for instance a bromochloro compound. For many purposes dibromo- and dichloro- compounds are preferred. Typical dihalo alkane compounds which may be used in the process of the invention include 1,2-dichloroethane, 1,2-dibromoethane, 1,2-diiodoethane, 1,3-dichloropropane, 1,3-dibrompropane, 1,3-diidopropane, 1,4-diiodobutane, 1,6-dichlorohexane, 1,6-diiodohexane, 1,8-dibromooctane, 1-12-dibromododecane or 1-bromo-4-chlorobutane. Compounds of this class such as 1,4-dichlorbutane, 1,4-dibromobutane or 1,6-dibromohexane are preferred. Compounds wherein a halogen atom is intermediate in the chain, such as 1,3-dibromobutane, are useful but are less preferred. Typical aromatic compounds which may be used in the process of the invention include dihalogenated xylenes for instance $\alpha\alpha'$-dichloro-p-xylene, or $\alpha\alpha'$-dibromo-o-xylene, or compounds of the naphthalene series such as 2,6-, or 2,7-bis(-bromomethyl)naphthalene.

It is known that the physical characteristics of polymers derived from monomers of the allylamine type are improved if the polymer is at least partially crosslinked. As a typical example reference is made to poly(diallylamine) which may be made by conventional means such as by dispersion polymerization using a redox initiator which in its non-crosslinked form is physically weak and soft and prone to swelling when brought into contact with dilute acid. These deficiencies may be decreased if the polymer is crosslinked using a conventional crosslinking agent for instance 1,6-bis(diallyl amino)hexane. Even after such treatment it is found that the polymer particles are soft, finely divided and have a tendency to stick together especially when the degree of crosslinking is small. Thus it is difficult to use such a partially crosslinked polymer as a component in an amphoteric ion-exchange resin of the mixed bed or of the "plum-pudding" type. It has now been found that these partially crosslinked polymers may be treated in a manner similar to that used for treating their uncrosslinked counterparts to provide novel polymers which have increased mechanical strength and a decreased tendency to swell in the presence of acid.

Accordingly in a further embodiment of the invention there is provided a process which comprises treating a polymeric material capable of acting as an ion-exchange material and comprising one or more allylamine constituents and containing a proportion of crosslinked material, with a dihalo organic compound in a manner such that the proportion of crosslinked material in said polymeric material is increased.

One convenient method whereby the process of the invention may be performed is to treat the polymeric material with a liquid so as to cause the polymer to swell and then react the treated polymer with a solution of the dihalo compound for a time and at a temperature sufficient for the desired degree of crosslinking to occur. Thus it is often desirable to react the swollen polymer with the dihalo compound at moderate temperatures, say from 40° to 100° C., for reaction times of about 24 hours using amounts of polymeric material and dihalo compound such that the ratio of polymeric material to dihalo material is in a range from 5:1 to 1:2. It is also convenient that there be present in the reaction mixture a sufficiency of an absorbent which is capable of reacting with the amount of acid which is generated during the reaction. Such an absorbent may be dispersed or dissolved in the reaction mixture and may be an organic or inorganic base. Typical examples of such absorbents include inorganic salts such as sodium carbonate, potassium bicarbonate or trisodium phosphate, and heterocyclic organic compounds, for instance pyridine. Liquids which are capable of inducing swelling in polymers of the allylamine class are well known and include the aliphatic alcohols typified by ethanol or methanol.

The polymers of the invention have enhanced physical strength in comparison with the polymers from which they may be derived. The polymers are suitable as ion-exchange resins and are eminently suitable as components of mixed bed ion-exchange resins or as components in "plum-pudding" resins or in ion-exchange resins of the polyamine matrix types.

The invention is now illustrated by, but is not limited to, the following examples wherein all parts and percentages are expressed on a weight basis unless otherwise specified.

EXAMPLE 1

This example describes a process wherein a new polymer was made by treating poly(diallylamine) with $\alpha\alpha'$-dichloro-p-xylene. The poly(diallylamine) was in the form of a dry free base which had been partially crosslinked with an amount of 1,6-bis(diallylamino) hexane equivalent to 5% on a molar basis in respect of the polymer. This partially crosslinked polymer was in the form of finely divided soft particles which stuck together very firmly and it had a swelling ratio of 3.8. By the term swelling ratio is meant the ratio of the volumes occupied by an amount of polymer which has been dispersed in 0.1 N HCl and 0.1 N NaOH respectively. The swelling ratio is a measure of the degree of crosslinking of the polymer—the lower the swelling ratio the greater is the degree of crosslinking of the polymer.

To a reaction vessel fitted with heating, cooling, stirring and condensing means and provided with a means whereby a vacuum could be created in the vessel there was added 100 parts of the above poly(diallylamine) which was then dispersed with stirring in 1500 parts by volume of methanol to provide a dispersion of the swollen polymer. A crosslinking solution of 45 parts of $\alpha\alpha'$-dichloro-p-xylene dissolved in 2000 parts by volume of methanol was added to the dispersion. The resultant mixture was heated to a temperature of 60° C. with stirring for 20 hours during which time a partial vacuum was created and maintained in the vessel so as to reduce the volume of air in the vessel. The solid component of the content of the vessel was separated from the liquid component of the content of the vessel and was washed firstly with boiling methanol then with an aqueous solution of sodium hydroxide and finally it was dried. There was thus obtained 145 parts of a polymeric material in which the swelling ratio was 1.4. The polymeric material so obtained was more robust than the polymer from which it was derived, it was less prone to agglomeration, and it was useful as a basic ion-exchange resin and had an ion-exchange capacity of 6.62 milliequivalents per gram of polymer. It had a titration curve of the flat type and the change in pH from 30% neutralization to 70% neutralization ($\Delta$pH 30/70) was 0.50 of a unit.

EXAMPLE 2

The general procedure of Example 1 was repeated except that firstly the poly(diallylamine) of the example was replaced as a starting material by a similarly crosslinked poly(diallylamine) wherein the degree of crosslinking was 2% on a molar basis in respect of the polymer. This lightly crosslinked polymer had a swelling ratio of 8.1 and a $\Delta$pH 30/70 value of 0.95 unit. It was in the form of finely divided particles which were somewhat more fragile than the corresponding polymer of Example 1. After being dispersed in 0.1N HCl solution 1 gram of the polymer occupied 45.6 milliliters. Secondly, the crosslinking solution of Example 1 was replaced by a solution of 90 parts of $\alpha\alpha'$-dichloro-p-xylene dissolved in a mixture of 2000 parts by volume of methanol and 1500 parts by volume of pyridine. There was thus obtained 190 parts of a polymer in which the swelling ratio was 1.4, the $\Delta$pH 30/70 value was 0.75 unit and 1 gram of the polymer occupied 4.7 milliliters after dispersion in 0.1 N HCl solution. It had a capacity as an ion exchange resin of 6.38 milliequivalents per gram and was similar in physical appearance and strength to the polymer obtained by the process of Example 1.

EXAMPLE 3

The general procedure of Example 2 was repeated except that in the present example the crosslinking solution of Example 2 was replaced by 122 parts of 1,6-dibromohexane in 2000 parts of methanol. There was thus obtained a basic polymer suitable for use as an ion-exchange resin and having an ion-exchange capacity of 7.06 milliequivalents per gram. The polymer had a swelling ratio of 1.7, a $\Delta$pH 30/70 value of 1.2 units and 1 gram thereof occupied 8.6 milliliters after dispersion in 0.1 N HCl solution.

EXAMPLE 4

The general procedure of Example 2 was repeated except that the amount of $\alpha\alpha'$-dichloro-p-xylene was increased to 112 parts to provide a robust polymer in which the swelling ratio was 1.3, the $\Delta$pH 30/70 value was 0.90 unit and 1 gram of polymer occupied 4.4 milliliters after dispersion in 0.1 N HCl solution.

EXAMPLE 5

The general procedure of Example 1 was repeated except that the amount of $\alpha\alpha'$-dichloro-p-xylene was reduced to 23 parts. There was thus obtained a basic ion-exchange resin which had a swelling ratio of 3.5, a ΔpH 30/70 value of 1.2 units and an ion-exchange capacity of 7.5 milliequivalents per gram.

EXAMPLE 6

The general procedure of Example 2 was repeated except that the crosslinking solution of that Example was replaced by a solution wherein 162 parts of 1,4-dibromobutane were dissolved in 2000 parts by volume of ethanol and 100 parts of sodium carbonate were dispersed in the solution. There was thus obtained an ion-exchange resin having a swelling ratio of 1.2, and an ion-exchange capacity of 5.8 milliequivalents per gram.

EXAMPLE 7

The general procedure of Example 6 was repeated except that the ethanol and sodium carbonate of that example were replaced by 500 parts by volume of methanol and 200 parts by volume of pyridine. The ion-exchange resin so obtained had a swelling ratio of 1.1, a ΔpH 70/30 value of 1.75 units and the volume occupied by 1 gram of the resin which had been dispersed in 0.1 N HCl was 11.9 milliliters. The resin had an ion-exchange capacity of 5.9 milliequivalents per gram.

EXAMPLE 8

A dispersion of 1 part of the ion-exchange resin obtained by the procedure of Example 7 and 25 parts by volume of 2 N aqueous NaOH was placed in a reaction vessel wherein it was refluxed under an atmosphere of nitrogen for 24 hours. The solid product resultant of this treatment was separated from the content of the vessel and washed with water and then with methanol to provide an ion-exchange resin having a swelling ratio of 1.3, a ΔpH 70/30 value of 0.5 unit, and the volume occupied by 1 gram of the resin which has been dispersed in 0.1 HCl was 4.9 milliliters. The resin had an ion-exchange capacity of 6.5 milliequivalents per gram.

EXAMPLE 9

The general procedure of Example 7 was repeated except that the 1,4-dibromobutane of that example was replaced by 95 parts of 1,4-dichlorobutane. There was thus obtained a polymer suitable for use as an ion-exchange resin having a swelling ratio of 1.3, a ΔpH 30/70 value of 1.95 units, an ion-exchange capacity of 6.7 milliequivalents/gram, whilst the volume occupied by 1 gram of the polymer which had been dispersed in 0.1 N HCl was 10.9 milliliters.

EXAMPLE 10

Into a vessel fitted with stirring means, and means whereby a vacuum may be created in the vessel there was placed 1580 parts of diallylamine hydrochloride, 970 parts of water 300 parts of 1,6-bis(N,N-diallylamino)hexane and 102 parts of azobisisobutyramidinium hydrochloride and these materials were stirred so as to form a solution. A vacuum was created in the vessel and then the above solution was injected into a reaction vessel fitted with stirring means, heating means and means whereby gas may be introduced into the vessel, and containing an atmosphere of nitrogen and 4000 parts by volume of a stirred paraffin oil heated to a temperature of 65° C. The content of the reaction vessel was maintained within a temperature range of 65° to 70° C. and stirred for 20 hours and during this time a multiplicity of resinous beads were formed. The beads were separated by filtration means from the content of the reaction vessel, washed with hexane, then with 2 N HCl, then with water and finally were dried to give 1400 parts of resinous beads which were substantially spherical and had diameters in the range from 0.2 to 1.4 millimeter. 100 parts of the beads so obtained were converted to a free base form and their mechanical strength was improved by the following process of treatment. The beads were dispersed with stirring in 1500 parts by volume of methanol to provide a dispersion of swollen polymeric beads. A solution of 45 parts of αα'-dichloro-p-xylene dissolved in 2000 parts by volume of methanol was added to the dispersion. The resultant mixture was heated under an atmosphere of nitrogen to a temperature of 60° C. with stirring for a period of 20 hours. The solid granular material so obtained was separated from the mixture, washed with boiling methanol, then with an aqueous solution of sodium hydroxide and finally it was dried. The polymeric material so obtained was useful as an ion exchange material.

EXAMPLE 11

The general procedure of Example 10 was repeated except that the solution of that example was modified by the addition thereto of 840 parts of finely ground polyacrylic acid resin particles and a further 870 parts of water. The resinous beads so obtained were similar in physical strength to those described in Example 10, and had a thermally regenerable ion-exchange capacity. The physical strength of the beads was enhanced by the following procedure. 100 parts of the beads were washed free of chloride ion with a 0.3 N aqueous solution of sodium hydroxide; the free base form beads so obtained were swollen by dispersion in 1500 parts by volume of methanol; a solution of 26 parts of αα'-dichloro-p-xylene dissolved in 2000 parts by volume of methanol was added to the dispersion and the resultant mixture was heated with stirring for 20 hours at a temperature in the range from 60° to 65° C. The solid granular ion-exchange material so obtained was separated from the mixture, washed with methanol and dried.

We claim:

1. A process for the reduction of the swelling propensity of partially addition crosslinked polymeric material, capable of acting as an ion exchange material and derived from a monomer of the allylamine type, which process comprises treating the said polymeric material with a liquid capable of swelling said polymeric material and with a dihalo organic compound capable of causing further crosslinking in the said polymeric material.

2. A process according to claim 1 wherein the said monomer is of the diallylamine type.

3. A composition capable of acting as a basic ion exchange material and comprising crosslinked polymeric material derived from a partially crosslinked polymeric intermediate derived from a monomer of the allylamine type and said crosslinked polymeric material is made by a process according to claim 1.

4. A process according to claim 1 wherein the said dihalo compound is selected from the group consisting of dichloro-, dibromo- and diiodo- derivatives of aralkyl compounds and saturated aliphatic compounds.

5. A process according to claim 4 wherein the said dihalo compound is selected from the bromo- and chloro- derivatives of the group consisting of xylenes and bis alkyl naphthalenes.

6. A process according to claim 5 wherein the said dihalo compound is selected from the group consisting of αα'-dichloro-p-xylene and αα'-dibromo-σ-xylene.

7. A process according to claim 5 wherein the said dihalo compound is selected from the group consisting of 2,6- and 2,7-bis(bromomethyl)naphthalene.

8. A process according to claim 4 wherein the said aliphatic compound is an alkane containing from 2 to 12 carbon atoms.

9. A process according to claim 4 wherein the said aliphatic compound is an alkane containing from 4 to 6 carbon atoms.

10. A process according to claim 9 wherein the said dihalo compound is selected from the group consisting of 1,4-dibromobutane, 1,6-dichlorobutane and 1,6-dibromohexane.

11. A process according to claim 1 wherein the said partially addition crosslinked polymeric material is a copolymer of said monomer and 1,6-bis(N,N-diallylamino) hexane.

12. A process according to claim 1 wherein first the said partially crosslinked polymeric material is treated with a liquid capable of causing said polymeric material to swell, and secondly treating the swollen polymeric material so produced with a solution of the said dihalo compound for a period of time up to 24 hours and at a temperature in a range from 40° to 100° C., optionally in the presence of a material capable of absorbing acid.

13. A process according to claim 12 wherein the said liquid capable of causing said polymeric material to swell is selected from the group consisting of methanol and ethanol.

14. A process according to claim 1 wherein the weight ratio of said polymeric material to said dihalo compound is in a range from 5:1 to 1:2.

15. A composition capable of acting as an ion-exchange material and comprising as a first component a composition according to claim 3 and as a second component a weakly acidic polymeric material.

16. A composition according to claim 15 wherein the said weakly acidic polymeric material comprises poly(acrylic acid).

17. A process for making an ion-exchange material which process comprises first, forming a mixture comprising as a first component partially addition crosslinked polymeric material capable of acting as an ion-exchange material and derived from a monomer of the allylamine type and as a second component polymeric material capable of acting as an ion-exchange material and derived from a weakly acidic monomer, and secondly, treating said mixture with a dihalo organic compound in a manner such that the propensity of the said first component of said ion-exchange material to swell is reduced.

* * * * *

UNITED STATES PATENT AND TRADEMARK OFFICE
CERTIFICATE OF CORRECTION

PATENT NO. : 4,167,610
DATED : September 11, 1979
INVENTOR(S) : Biran A. Bolto and Kurt H. Eppinger It is certified that error appears in the above—identified patent and that said Letters Patent is hereby corrected as shown below:

Please correct the heading as follows:

"(73) Assignee: ICI Australia Limited, Melbourne, Australia and Commonwealth Scientific and Industrial Research Organization, Campbell, Australian Capital Territory".

Signed and Sealed this

Fourth Day of March 1980

[SEAL]

Attest:

SIDNEY A. DIAMOND

Attesting Officer

Commissioner of Patents and Trademarks